US012159565B2

(12) United States Patent
Park

(10) Patent No.: US 12,159,565 B2
(45) Date of Patent: Dec. 3, 2024

(54) ELECTROLUMINESCENT DISPLAY APPARATUS AND DRIVING DEVICE THEREOF

(71) Applicant: LG Display Co., Ltd., Seoul (KR)

(72) Inventor: Min Ju Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 273 days.

(21) Appl. No.: 17/939,775

(22) Filed: Sep. 7, 2022

(65) Prior Publication Data

US 2023/0196976 A1 Jun. 22, 2023

(30) Foreign Application Priority Data

Dec. 16, 2021 (KR) ........................ 10-2021-0180764

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0842* (2013.01); *G09G 2320/0233* (2013.01); *G09G 2320/043* (2013.01)

(58) Field of Classification Search
CPC ............... G09G 3/2096; G09G 3/3233; G09G 2320/0233; G09G 2320/043
See application file for complete search history.

(56) References Cited

U.S. PATENT DOCUMENTS

| | | | | |
|---|---|---|---|---|
| 9,916,803 | B2 * | 3/2018 | Hohjoh | G09G 3/3666 |
| 10,013,920 | B2 * | 7/2018 | Oh | G09G 3/3291 |
| 10,186,184 | B2 * | 1/2019 | Kim | G09G 3/2044 |
| 10,522,081 | B2 * | 12/2019 | Kim | G09G 3/2092 |
| 10,803,784 | B2 * | 10/2020 | Kim | G09G 3/3225 |
| 10,902,789 | B2 * | 1/2021 | Park | G09G 3/3225 |
| 11,056,067 | B2 * | 7/2021 | Jun | G09G 3/3607 |
| 11,244,626 | B2 * | 2/2022 | Kim | G09G 3/3233 |
| 11,386,832 | B1 * | 7/2022 | Yoo | G09G 3/2096 |
| 11,568,829 | B2 * | 1/2023 | Chen | G09G 3/3406 |
| 11,710,439 | B2 * | 7/2023 | Minaki | G09G 3/3291<br>345/694 |
| 11,990,079 | B2 * | 5/2024 | Kim | G09G 3/2092 |

* cited by examiner

*Primary Examiner* — Gene W Lee
(74) *Attorney, Agent, or Firm* — Birch, Stewart, Kolasch & Birch, LLP

(57) ABSTRACT

An electroluminescent display apparatus can include a display panel including a first active region configured to display first image data and a second active region configured to display second image data. The apparatus can further include a first memory configured to store a first main compensation value and a first boundary compensation value, corresponding to first pixels in the first active region, and a second memory configured to store a second main compensation value and a second boundary compensation value, corresponding to second pixels in the second active region. The apparatus can further include a first timing controller configured to correct the first image data based on the first main compensation value and the first and second boundary compensation values, and a second timing controller configured to correct the second image data based on the second main compensation value, the second boundary compensation value, and the first boundary compensation value.

18 Claims, 8 Drawing Sheets

ELECTROLUMINESCENT DISPLAY APPARATUS AND DRIVING DEVICE THEREOF

CROSS-REFERENCE TO RELATED APPLICATIONS

This application claims the priority benefit of the Korean Patent Application No. 10-2021-0180764 filed in the Republic of Korea on Dec. 16, 2021, the entire contents of which are hereby expressly incorporated by reference into the present application.

BACKGROUND OF THE DISCLOSURE

Technical Field

The present disclosure relates to an electroluminescent display apparatus and a driving device thereof.

Discussion of the Related Art

As process technology and driving circuit technology for display apparatuses advance, the market for display apparatuses having a large screen and a high resolution is expanding. In order to implement a high-quality image, display apparatuses for realizing a high resolution, color depth extension, and high speed driving are being developed.

Electroluminescent display apparatuses have a fast response time, excellent emission efficiency, excellent luminance, and a wide viewing angle, and thus, are high in usability of display apparatuses. However, when a screen size and a resolution of electroluminescent display apparatuses increase, a difference in time change and driving characteristic deviation of each pixel increases based on a screen position. Therefore, in the electroluminescent display apparatuses, it may be difficult to implement a high resolution and a large screen for realizing the uniform image quality of pixels in the entire screen.

SUMMARY OF THE DISCLOSURE

To address the aforementioned limitations of the related art, the present disclosure can provide an electroluminescent display apparatus having a high resolution and a large screen for realizing uniform image quality in the entire screen and a driving device of the electroluminescent display apparatus.

To achieve these objects and other advantages and in accordance with the purpose of the disclosure, as embodied and broadly described herein, an electroluminescent display apparatus includes a display panel including a first active region configured to display first image data and a second active region configured to display second image data, a first memory configured to store a first main compensation value and a first boundary compensation value, corresponding to first pixels in the first active region, a second memory configured to store a second main compensation value and a second boundary compensation value, corresponding to second pixels in the second active region, a first timing controller configured to correct the first image data based on the first main compensation value, the first boundary compensation value, and the second boundary compensation value, and a second timing controller configured to correct the second image data based on the second main compensation value, the second boundary compensation value, and the first boundary compensation value.

In another aspect of the present disclosure, a driving device of an electroluminescent display apparatus including a first active region of a display panel including first pixels and displaying first image data and a second active region of the display panel including second pixels and displaying second image data, is provided. The driving device can include a first memory configured to store a first main compensation value and a first boundary compensation value, corresponding to the first pixels, a second memory configured to store a second main compensation value and a second boundary compensation value, corresponding to the second pixels, a first timing controller configured to correct the first image data based on the first main compensation value, the first boundary compensation value, and the second boundary compensation value, and a second timing controller configured to correct the second image data based on the second main compensation value, the second boundary compensation value, and the first boundary compensation value.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
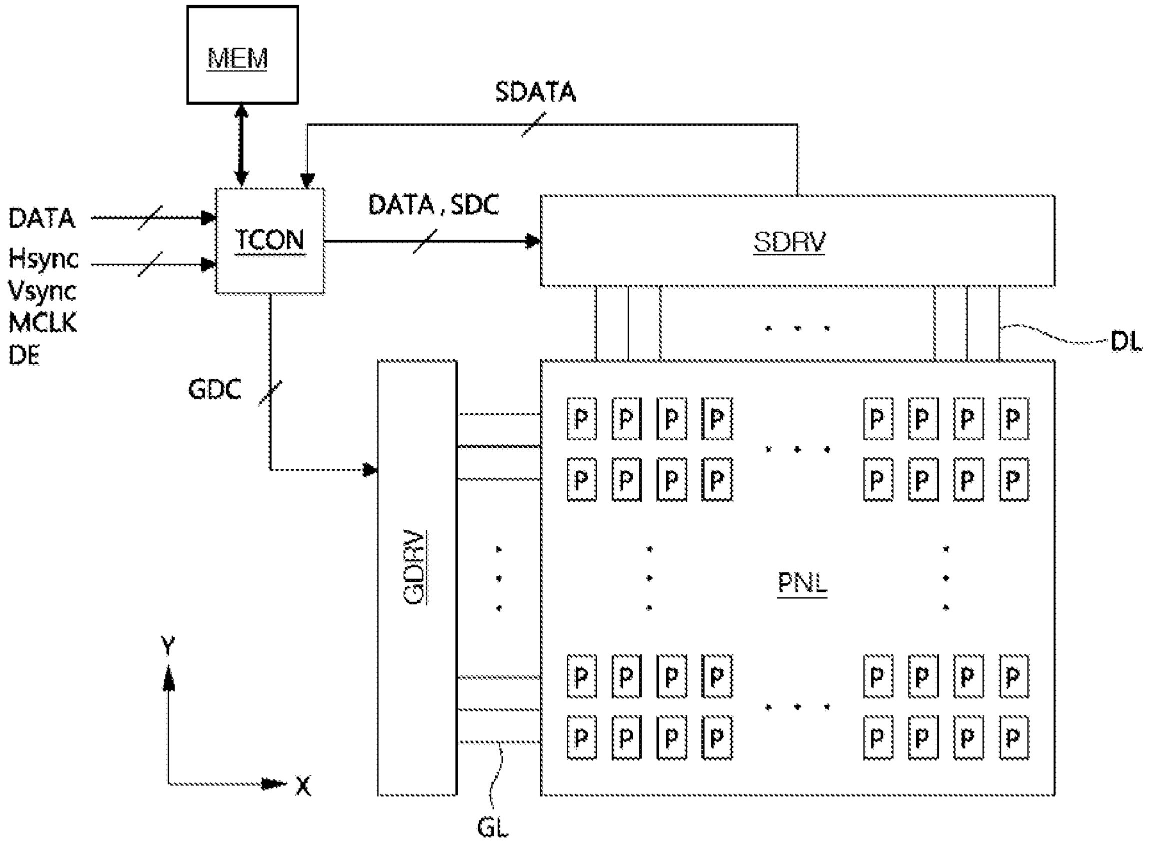
FIG. 1 is a diagram schematically illustrating an electroluminescent display apparatus according to an embodiment of the present disclosure.

Hereinafter, in an electroluminescent display apparatus according to embodiments of the present disclosure, an organic light emitting display apparatus will be mainly described, but the inventive concept is not limited thereto. Each of pixels of an organic light emitting display apparatus according to embodiments of the present disclosure can include a driving element which controls a current flowing in an organic light emitting diode (OLED) of each pixel. The driving element can be implemented as a transistor. It can be designed that driving characteristics of pixels such as a threshold voltage and mobility are equal in all pixels, but an electrical characteristic of the driving element is not uniform due to the non-uniformity and driving environment of a manufacturing process.

In the OLED and the driving element, as a driving time increases, a stress applied thereto may increase, and a stress difference may occur due to a data voltage. An electrical characteristic of the driving element may be adversely affected by a stress. As a driving time increases, pixels may be degraded, and the degree of degradation between pixels may differ, whereby a degradation in image quality may be shown on a screen.

Accordingly, the organic light emitting display apparatus can compensate for a degradation in driving characteristic of pixels by using an internal compensation method and an external compensation method, in order to compensate for a degradation in driving characteristic of pixels and implement a uniform driving characteristic thereof.

The internal compensation method can automatically compensate for a threshold voltage deviation between driving elements, in a pixel circuit. An internal compensation circuit, which compensates for a data voltage by a threshold voltage of a driving element and an OLED so that a current flowing in the OLED is not affected by the threshold voltage of the driving element and the OLED, can be added to each pixel, for internal compensation.

The external compensation method can sense a driving characteristic (a threshold voltage, mobility, etc.) of each pixel and can modulate input video data an external compensation circuit outside a display panel based on a sensing result to compensate for a driving characteristic change of each pixel.

The external compensation method can sense a voltage or a current of a pixel through a sensing circuit connected to the pixel in a display panel, convert a sensing result into digital data by using an analog-to-digital converter (hereinafter referred to as an ADC), and transfer the digital data to a timing controller. The timing controller can modulate digital video data of an input video based on the sensing result of the pixel to compensate for a driving characteristic change of the pixel.

In the following embodiments, an example where a pixel circuit is connected to a sensing circuit for external compensation is illustrated, but the present disclosure is not limited thereto. For example, a pixel circuit according to the present disclosure can further include an internal compensation circuit.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms “comprise”, “having,” “including” and the like suggest that other parts can be added unless the term “only” is used. As used herein, the singular forms “a”, “an”, and “the” are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as “on-”, “over-”, “under-”, and “next-”, one or more other parts can be disposed between the two parts unless “just” or “direct” is used.

It will be understood that, although the terms “first”, “second”, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

Hereinafter, embodiments of the present disclosure will be described in detail with reference to the accompanying drawings. In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a diagram schematically illustrating an electroluminescent display apparatus according to an embodiment of the present disclosure. All the components of the electroluminescent display apparatus are operatively coupled and configured. Further, FIG. 2 is a diagram schematically illustrating a pixel array of the electroluminescent display apparatus, a pixel circuit included in the pixel array, and a panel driving circuit.

Figure 2:
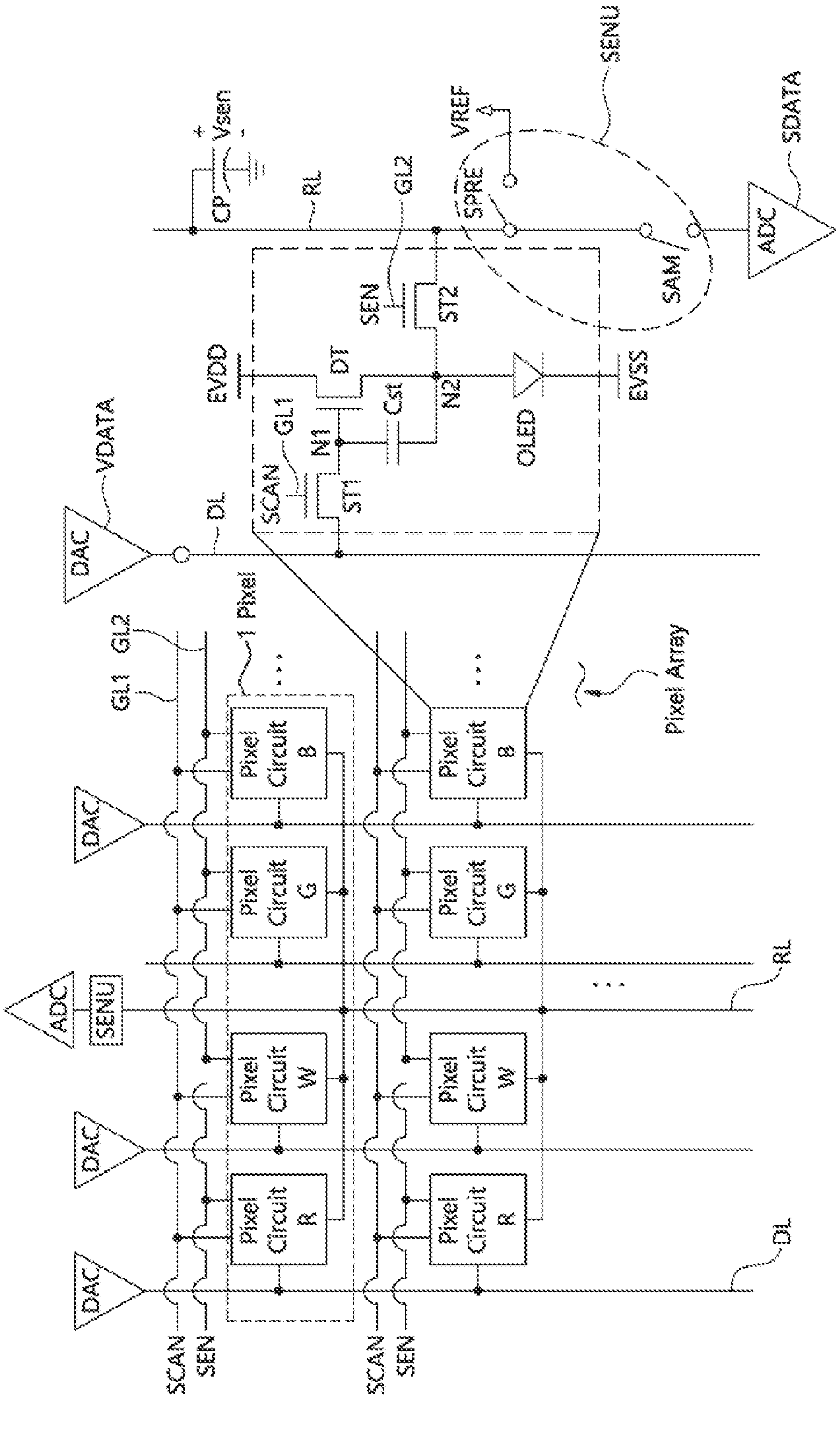
FIG. 2 is a diagram schematically illustrating a pixel array of the electroluminescent display apparatus, a pixel circuit included in the pixel array, and a panel driving circuit.

Referring to FIGS. 1 and 2, the electroluminescent display apparatus according to an embodiment of the present disclosure can include a display panel PNL, a panel driving circuit SDRV and GDRV for driving the display panel PNL, a timing controller TCON for controlling an operation of the panel driving circuit SDRV and GDRV, and a memory MEM.

A pixel array including a plurality of pixels arranged in a matrix form can be provided in the display panel PNL. The pixel array can be an active region which displays input image data DATA.

The plurality of pixels can be arranged in the active region, and signal lines for transferring a driving voltage to the plurality of pixels can be arranged in the active region. The signal lines can include a plurality of data lines DL for transferring a data voltage Vdata, a plurality of gate lines GL for transferring a gate signal SCAN and SEN, and a plurality of readout lines RL for transferring a reference voltage VREF and sensing a pixel driving characteristic Vsen. The signal lines arranged in the active region can further include a driving voltage line for transferring a high level pixel voltage EVDD. In the active region, the data lines DL and the readout lines RL can be arranged to extend in a first direction, and the gate lines GL can be arranged to extend in a second direction intersecting with the first direction. The signal lines can be connected to a pixel circuit of each pixel and can be connected to the panel driving circuit. Also, a low level pixel voltage EVSS can be supplied to the active region. Here, the low level pixel voltage EVSS can be a common voltage applied to all pixels. The low level pixel voltage EVSS can be applied to be higher in a sensing mode for detecting a driving characteristic than a display mode for applying an image.

A plurality of pixels can configure one unit pixel. For example, red (R), white (W), green (G), and blue (B) pixels adjacent to one another in an X direction can configure one unit pixel. However, the R, G, and B pixels can configure one unit pixel, and in this case, a W subpixel can be omitted in the pixel array. The R, W, G, and B pixels can merely include different light emitting materials included in light emitting devices and can be substantially equal in the other configuration of a pixel circuit. But the present disclosure is not limited thereto. For example, one unit pixel comprised of pixels of a combination of other colors is possible.

As in FIG. 2, one pixel can include a light emitting device OLED, a driving thin film transistor (TFT) DT, switch TFTs ST1 and ST2, and a storage capacitor Cst. The driving TFT DT and the switch TFTs ST1 and ST2 can each be implemented as an NMOS transistor, but are not limited thereto. For example, at least one of the driving TFT DT and the switch TFTs ST1 and ST2 can be implemented as a PMOS transistor.

The light emitting device OLED can be a light emitting device which emits light having strength corresponding to a pixel current input from the driving TFT DT. The light emitting device OLED can be implemented as an organic light emitting diode including an organic light emitting layer, or can be implemented as an inorganic light emitting diode including an inorganic light emitting layer. An anode electrode of the light emitting device OLED can be connected to a second node N2, and a cathode electrode thereof can be connected to an input terminal for the low level pixel voltage EVSS.

The driving TFT DT can be a driving element which generates a pixel current based on a gate-source voltage. A gate electrode of the driving TFT DT can be connected to a first node N1, a first electrode (a drain electrode) thereof can be connected to an input terminal for the high level pixel voltage EVDD, and a second electrode (a source electrode) thereof can be connected to the second node N2.

The switch TFTs (for example, first and second switch TFTs) ST1 and ST2 can be switch elements which set a gate-source voltage of the driving TFT DT and connect the second electrode of the driving TFT DT to the readout line RL.

The first switch TFT ST1 can be connected between a data line DL and the first node N1 and can be turned on based on a first gate signal SCAN from a first gate line GL1. When the first switch TFT ST1 is turned on, a display or sensing data voltage VDATA can be applied to the first node N1. A gate electrode of the first switch TFT ST1 can be connected to the first gate line GL1, a first electrode thereof can be connected to the data line DL, and a second electrode thereof can be connected to the first node N1.

The second switch TFT ST2 can be connected between the readout line RL and the second node N2 and can be turned on based on a second gate signal SEN from a second gate line GL2. The second switch TFT ST2 can be turned on in setup in each of the display mode and the sensing mode and can apply a reference voltage VREF to the second node N2. Also, the second switch TFT ST2 can be turned on in performing a sensing operation after setup in the sensing mode and can transfer a source node voltage (or a source voltage) of the driving TFT DT to the readout line RL. Therefore, a sensing voltage Vsen corresponding to the source voltage can be stored in a parasitic capacitor Cp of the readout line RL. A gate electrode of the second switch TFT ST2 can be connected to the second gate line GL2, a first electrode thereof can be connected to the readout line RL, and a second electrode thereof can be connected to the second node N2.

The storage capacitor Cst can be connected between the first node N1 and the second node N2 and can hold the gate-source voltage of the driving TFT DT during a certain duration. In the display mode, the gate-source voltage of the driving TFT DT can be set to a difference voltage between the display data voltage VDATA and the reference voltage VREF, and in the sensing mode, the gate-source voltage of the driving TFT DT can be set to a difference voltage between the sensing data voltage VDATA and the reference voltage VREF.

In the display mode, a pixel current corresponding to the gate-source voltage of the driving TFT DT can flow in the driving TFT DT, and the light emitting device OLED can emit light with the pixel current. In the sensing mode, the pixel current corresponding to the gate-source voltage of the driving TFT DT can flow in the driving TFT DT, and the source node voltage of the driving TFT DT can be changed by the pixel current. Because the source node voltage varies based on a driving characteristic of the driving TFT DT, a driving characteristic change of the driving TFT DT can be detected based on the sensing voltage Vsen corresponding to the source node voltage. Also, in the sensing mode, because the low level pixel voltage EVSS is applied to be higher than an operation point voltage of the light emitting device OLED, the pixel current of the driving TFT DT may not flow to the light emitting device OLED and can flow to only the readout line RL. Accordingly, the source node voltage can be reflected in the sensing node Vsen for a short time, and thus, sensing reliability can increase.

Such a configuration and operation of a pixel can be merely an embodiment, and the inventive concept is not limited thereto. For example, the first and second gate signals SCAN and SEN and the first and second gate lines GL1 and GL2 can be implemented as one body. Also, a configuration of a pixel can be designed based on a double rate driving scheme.

The pixel driving circuit can include a data driver SDRV which supplies the data voltage VDATA to the data lines DL and a gate driver GDRV which supplies the gate lines GL of the pixel array with the gate signals SCAN and SEN synchronized with the data voltage VDATA.

The data driver SDRV can include a digital-to-analog converter DAC which generates the data voltage VDATA, a sensing circuit SENU, and an analog-to-digital converter ADC. In the display mode, the digital-to-analog converter DAC can convert image data DATA, supplied from the timing controller TCON, into the display data voltage VDATA based on a source timing control signal and can supply the display data voltage VDATA to the data lines DL. In the sensing mode, the digital-to-analog converter DAC can generate the sensing data voltage VDATA and can supply the sensing data voltage VDATA to the data lines DL.

The sensing circuit SENU can supply the reference voltage VREF to the readout lines RL in the display mode. In the sensing mode, the sensing circuit SENU can supply the reference voltage VREF to the readout lines RL and can sample the sensing voltage Vsen charged into the readout lines RL. The sensing circuit SENU can include a reference voltage switch SPRE connected between the readout line RL and a reference voltage VREF input terminal and a sampling switch SAM connected between the readout line RL and the analog-to-digital converter ADC. The reference voltage switch SPRE can be turned on in only a setup period of the display mode/sensing mode, and the sampling switch SAM can be turned on in only a sampling period of the sensing mode.

The analog-to-digital converter ADC can digital-process a sampling voltage which is generated when the sampling switch SAM is turned on in the sensing mode, and thus, can output sensing result data SDATA.

The gate driver GDRV can receive an operation voltage and a gate timing control signal through the data driver SDRV. The gate driver GDRV can be embedded into a non-display area outside the active region of the display panel PNL. The gate driver GDRV can generate the first and second gate signals SCAN and SEN based on the gate timing control signal and can supply the first and second gate signals SCAN and SEN to the first and second gate lines GL1 and GL2. The first and second gate signals SCAN and SEN can select a pixel row to which the display data voltage VDATA is to be applied in the display mode and can select a pixel row to which the sensing data voltage VDATA is to be applied in the sensing mode. Here, a pixel row can denote a set of signal lines and pixels adjacent to one another in the X direction.

The memory MEM can store a compensation value for compensating for a driving characteristic change of pixels. Pixel compensation values stored in the memory MEM can be updated whenever the sensing mode is repeated. The memory MEM can be implemented as flash memory.

When a system power source is turned on, the timing controller TCON can access the memory MEM and can read the pixel compensation value from the memory MEM. The timing controller TCON can include an external compensation circuit which corrects video data based on the pixel compensation value to compensate for a driving characteristic change of pixels.

In the electroluminescent display apparatus according to the present embodiment including the active region, the panel driving circuits SDRV and GDRV, the timing controller TCON, and the memory MEM provided on one display panel substrate illustrated in FIGS. 1 and 2, a display apparatus having a high resolution and a large screen can be implemented by a combination of two or more among these elements.

Figure 3:
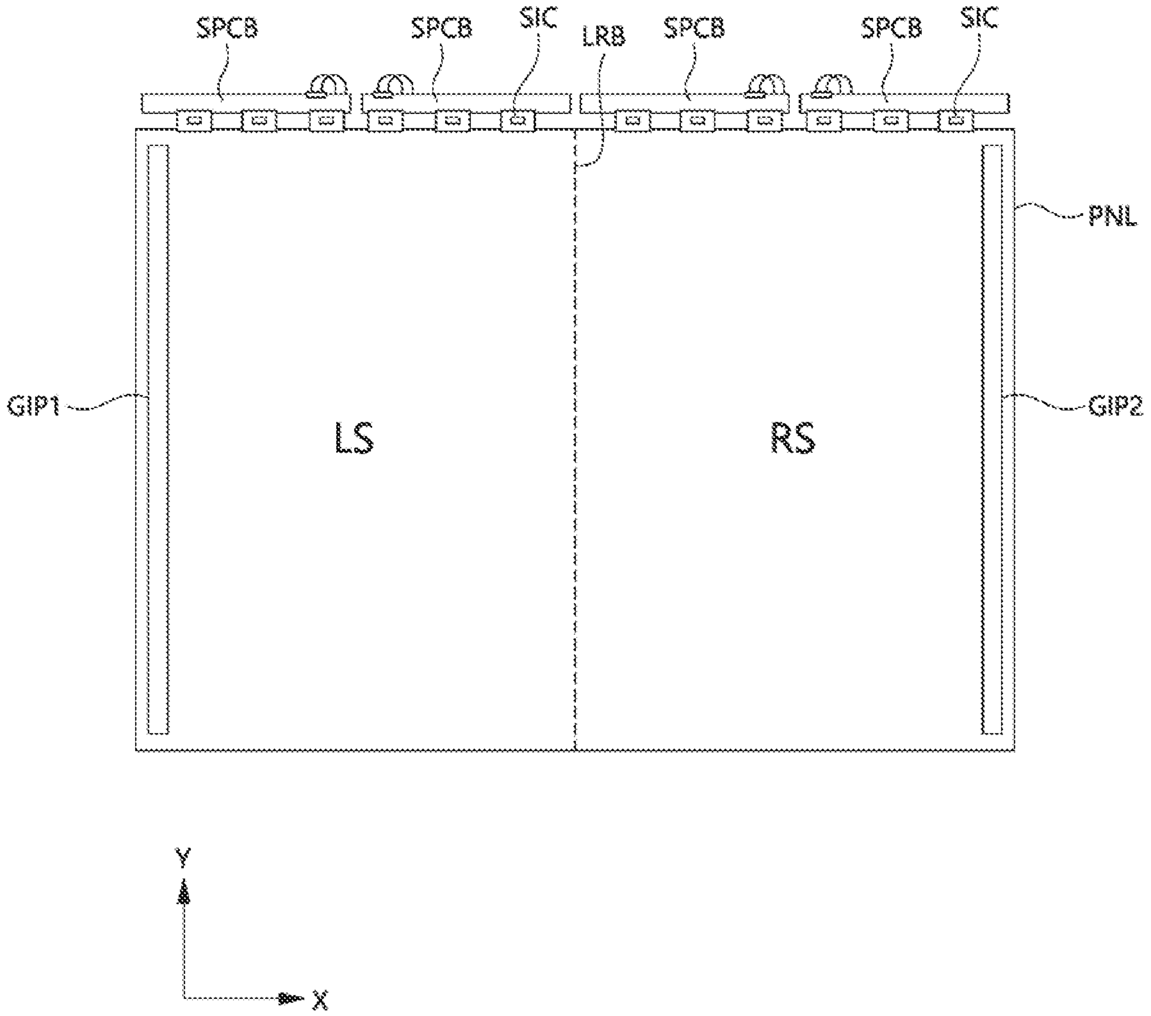
FIG. 3 is a front view as seen from a forward region with respect to the electroluminescent display apparatus.
Figure 4:
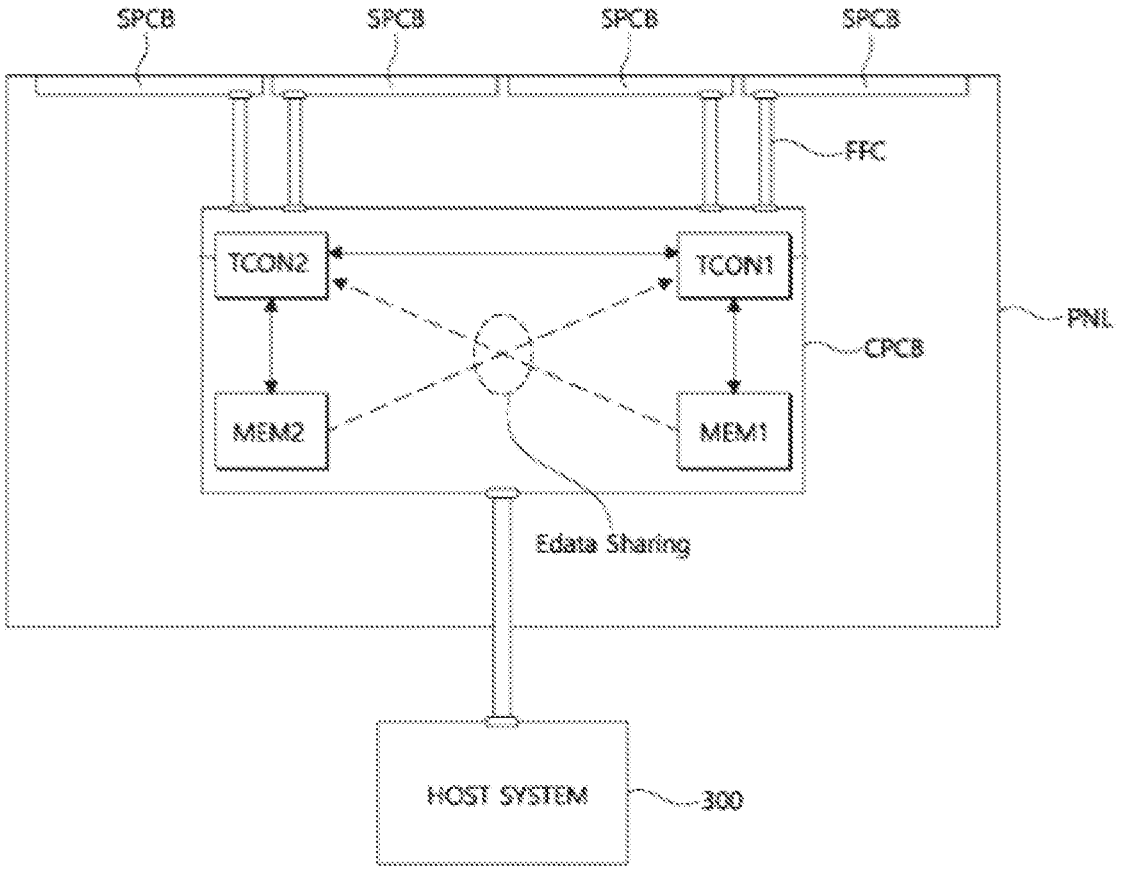
FIG. 4 is a rear view as seen from a rear region with respect to the electroluminescent display apparatus.
Figure 5:
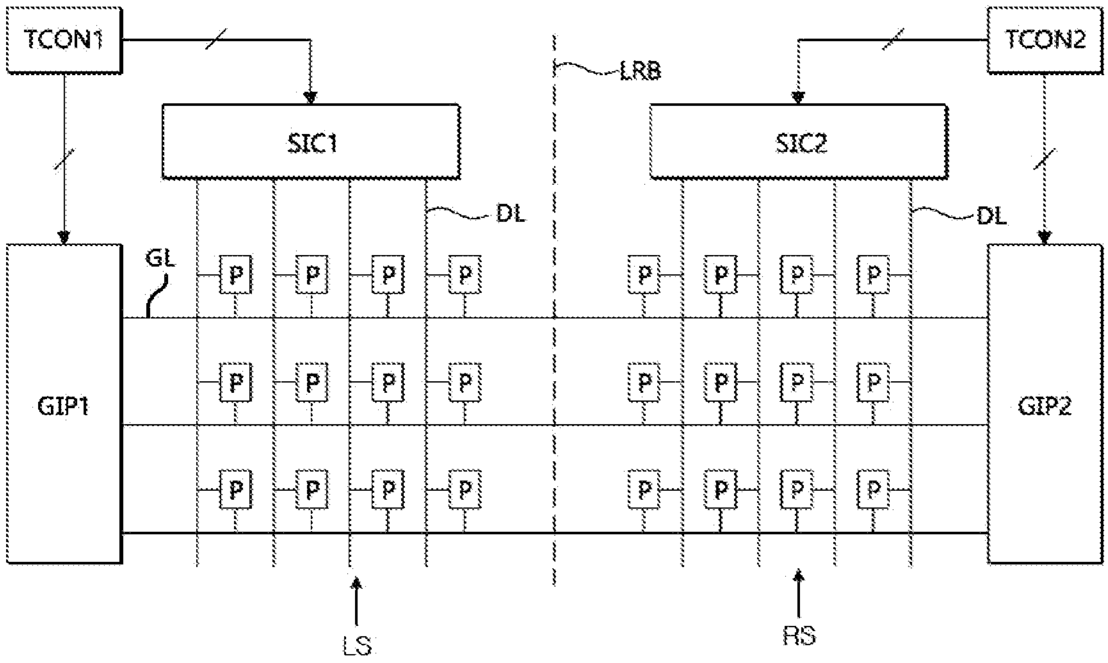
FIG. 5 is a diagram illustrating an example where a display panel of the electroluminescent display apparatus is divided into a first active region and a second active region and divisionally driven with respect to a boundary line.

FIG. 3 is a front view as seen from a forward region with respect to the electroluminescent display apparatus. FIG. 4 is a rear view as seen from a rear region with respect to the electroluminescent display apparatus. FIG. 5 is a diagram illustrating an example where a display panel of the electroluminescent display apparatus is divided into a first active region and a second active region and divisionally driven with respect to a boundary line.

Referring to FIGS. 3 to 5, a screen of a display panel PNL can be divided into two active regions (for example, first and second active regions) LS and RS. The first active region LS can be disposed at a left region of the screen and can be controlled by a first timing controller TCON1. The second active region RS can be disposed at a right region of the screen and can be controlled by a second timing controller TCON2.

A data driver SDRV can be integrated into a source drive integrated circuit (IC) SIC and can be connected to data lines DL and readout lines RL. A gate driver GDRV can be directly provided on a substrate of the display panel PNL. In FIG. 3, a gate-in panel (GIP) can denote the gate driver GDRV directly provided on the substrate of the display panel PNL.

In FIG. 3, "LRB" can represent a boundary line between the first active region LS and the second active region RS. The boundary line LRB can denote a boundary line which is controlled by the first and second timing controllers TCON1 and TCON2 at different timings. The boundary line LRB may not denote that the substrate of the display panel PNL is physically divided, but is not limited thereto.

A chip-on film (COF) with source drive ICs SIC mounted thereon can be connected between the display panel PNL and a source printed circuit board (PCB). A gate driving voltage and gate timing control signals for controlling gate drivers GIP1 and GIP2 can be transferred to the gate drivers GIP1 and GIP2 of the display panel PNL through the COF.

The first and second timing controllers TCON1 and TCON2 can be mounted on a control board CPCB along with memories MEM1 and MEM2. The first and second timing controllers TCON1 and TCON2 can each be implemented as an application-specific integrated circuit (ASIC), but are not limited thereto.

The first and second timing controllers TCON1 and TCON2 can receive a high-resolution input video from a host system 300. The first and second timing controllers TCON1 and TCON2 can respectively control driving of the first active region LS and the second active region RS. The first timing controller TCON1 can separate the high-resolution input video into first video data which is to be applied to the first active region LS, and the second timing controller TCON2 can separate the high-resolution input video into second video data which is to be applied to the second active region RS.

The memories MEM1 and MEM2 can include a first memory MEM1 which stores a first compensation value corresponding to pixels of the first active region LS and a second memory MEM2 which stores a second compensation value corresponding to pixels of the second active region RS. The first compensation value of the first memory MEM1 can include a first main compensation value and a first boundary compensation value, and the second compensation value of the second memory MEM2 can include a second main compensation value and a second boundary compensation value.

The first and second timing controllers TCON1 and TCON2 can share boundary compensation values Edata stored in the memories MEM1 and MEM2. The first timing controller TCON1 can access the first memory MEM1 to read the first compensation value (main+boundary) therefrom and can access the second memory MEM2 to read the second boundary compensation value therefrom. The first timing controller TCON1 can correct the first video data based on the read compensation values. The second timing controller TCON2 can access the second memory MEM2 to read the second compensation value (main+boundary) therefrom and can access the first memory MEM1 to read the first boundary compensation value therefrom. The second timing controller TCON2 can correct the second video data based on the read compensation values. Because each of the first and second timing controllers TCON1 and TCON2 refers to all of the first boundary compensation value and the second boundary compensation value so as to correct video data, a possibility that a visual step occurs near the boundary line LRB can be minimized.

A main board of the host system 300 can include a user input device which receives a user command, a communication module which communicates with peripheral devices, a communication module which is connected to a communication network such as Internet, and a graphics processing module which is connected to the electroluminescent display apparatus. The main board can be connected to a power supply which generates power. The power supply can supply the main board and the panel driving circuit with a commercial alternating current (AC) power or power from a battery. The host system 300 can be a system requiring a display apparatus like a television system and a computer system.

A level shifter and a power management integrated circuit (PMIC) can be further mounted on the control board CPCB. The PMIC can receive a direct current (DC) input voltage by using a DC-DC converter to output various DC voltages (for example, EVDD, EVSS, a gate high voltage (VGH), a gate low voltage (VGL), and a gamma reference voltage) needed for driving of the display panel.

The level shifter can shift a voltage level of a gate timing control signal received from the first and second timing controllers TCON1 and TCON2 to generate a voltage which swings between VGH and VGL. A scan pulse output from the gate drivers GIP1 and GIP2 can swing between VGH and VGL. The gate high voltage (VGH) can be a gate-on voltage for turning on a switch TFT of the pixel circuit. The gate low voltage (VGL) can be a gate-off voltage for turning off the switch TFT of the pixel circuit. But the present disclosure is not limited thereto. The gate high voltage (VGH) can also be a gate-off voltage for turning off a switch TFT of the pixel circuit, when the switch TFT is implemented as a PMOS transistor.

Each of the first and second timing controllers TCON1 and TCON2 can transfer corrected image data to the source drive IC SIC controlled thereby. Also, each of the first and second timing controllers TCON1 and TCON2 can transfer control data and a clock to the source drive IC SIC controlled thereby along with the corrected image data.

The control board CPCB can be connected to a source PCB SPCB through a flexible flat cable (FFC) and can be connected to the main board of the host system 300 through an FFC.

The gate lines GL can be disposed in active regions horizontally adjacent to one another across the boundary line LRB between the first active region LS and the second active region RS without disconnection. As illustrated in FIG. 5, the gate drivers GIP1 and GIP2 can be connected to both sides of the gate lines GL. The scan pulse can be simultaneously applied to both sides of the same gate line through the gate drivers GIP1 and GIP2 connected to both ends of the gate line GL.

The data lines DL and the readout lines RL arranged in the first active region LS in the screen of the display panel PNL can be connected to a source drive IC SIC1 which drives the first active region LS. The data lines DL and the readout lines RL arranged in the second active region RS in the screen of the display panel PNL can be connected to a source drive IC SIC2 which drives the second active region RS.

The first timing controller TCON1 can transfer the corrected image data of the first active region LS to the source driver IC SIC1 of a first driving circuit SIC1 and GIP1. The first timing controller TCON1, as illustrated in FIG. 5, can control an operation timing of the first driving circuit SIC1 and GIP1 for driving pixels of the first active region LS.

The second timing controller TCON2 can transfer the corrected image data of the second active region RS to the source driver IC SIC2 of a second driving circuit SIC2 and GIP2. The second timing controller TCON2, as illustrated in FIG. 5, can control an operation timing of the second driving circuit SIC2 and GIP2 for driving pixels of the second active region RS.

The first and second timing controllers TCON1 and TCON2 can further execute an image quality enhancement algorithm based on a data operational result of a boundary surface between the active regions LS and RS.

Figure 6:
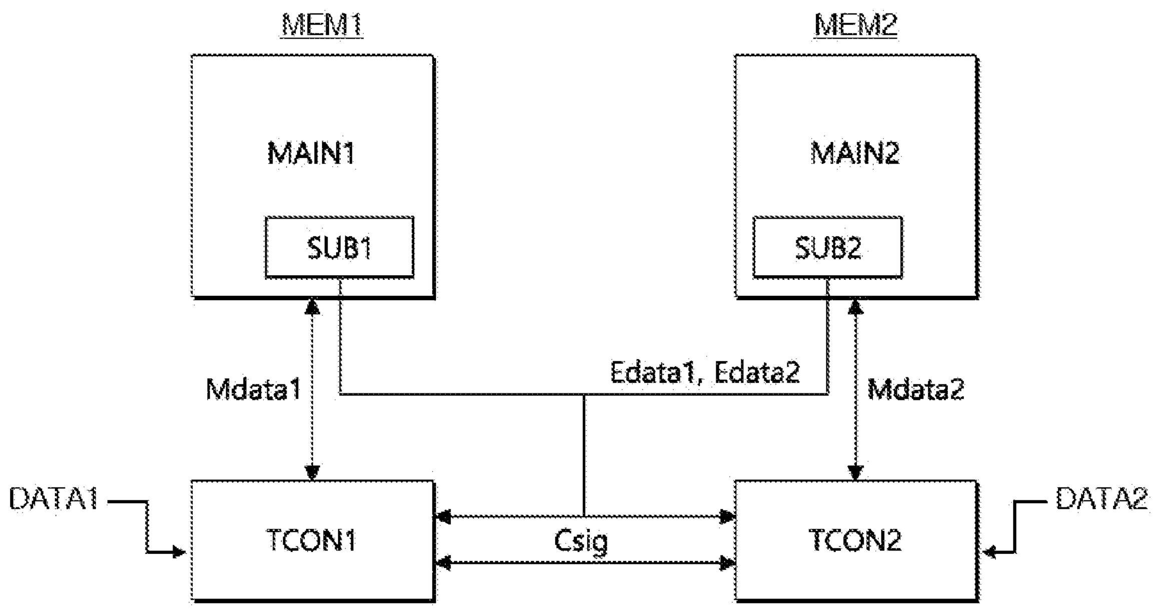
FIG. 6 is a diagram illustrating a connection configuration between a memory and a timing controller for divisional driving.
Figure 7:
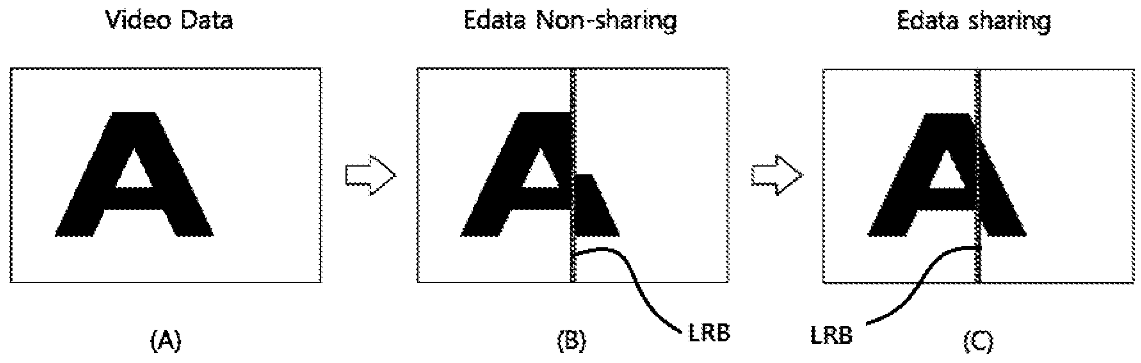
FIG. 7 is a diagram showing a comparison result obtained by comparing an image display state of a state, where a boundary compensation value is shared, with an image display state of a state where the boundary compensation value is not shared.

FIG. 6 is a diagram illustrating a connection configuration between a memory and a timing controller for divisional driving. FIG. 7 is a diagram showing a comparison result obtained by comparing an image display state of a state, where a boundary compensation value is shared, with an image display state of a state where the boundary compensation value is not shared.

Referring to FIG. 6, when a system power source is turned on, timing controllers (for example, first and second timing controllers) TCON1 and TCON2 can access memories (for example, first and second memories) MEM1 and MEM2. An access time of each of the timing controllers TCON1 and TCON2 can be controlled by a control signal Csig.

The first memory MEM1 can include a first main region MAIN1 storing a first main compensation value Mdata1 and a first sub-region SUB1 storing a first boundary compensation value Edata1. The second memory MEM2 can include a second main region MAIN2 storing a second main compensation value Mdata2 and a second sub-region SUB2 storing a second boundary compensation value Edata2.

The first boundary compensation value Edata1 can be a common compensation value for compensating for all of a driving characteristic deviation of first pixels disposed near a boundary line of a screen in the first active region and a driving characteristic deviation of second pixels disposed near the boundary line in the second active region. Likewise, the second boundary compensation value Edata2 can be a common compensation value for compensating for all of a driving characteristic deviation of the first pixels disposed near the boundary line of the screen in the first active region and a driving characteristic deviation of the second pixels disposed near the boundary line in the second active region. The expression "near the boundary line" means the distance to the boundary line is less than half of the width of the screen, e.g., less than 1080 pixels, less than 540 pixels, less than 10 pixels, less than 5 pixels or even less than 3 pixels.

The first main compensation value Mdata1 can include compensation values for compensating for a driving characteristic deviation of pixels other than the first pixels in the first active region. Also, the second main compensation value Mdata2 can include compensation values for compensating for a driving characteristic deviation of pixels other than the second pixels in the second active region.

The driving characteristic deviation can include one or more of a threshold voltage deviation of a driving TFT included in a pixel, an electron mobility deviation of the driving TFT, and a threshold voltage deviation of a light emitting device. Sensing values representing the driving characteristic deviation can be periodically updated in a sensing mode, and whenever new sensing values are obtained, the compensation values Mdata1,2 and Edata1,2 can be updated and stored in the memories MEM1 and MEM2. When the system power source is turned on, the first timing controller TCON1 can monopolize (or control) the first main region MAIN1 of the first memory MEM1 and can read a first main compensation value Mdata1 from the first main region MAIN1 of the first memory MEM1. When the system power source is turned on, the second timing controller TCON2 can monopolize (or control) the second main region MAIN2 of the second memory MEM2 and can read a second main compensation value Mdata2 from the second main region MAIN2.

When the system power source is turned on, the timing controllers TCON1 and TCON2 can share the first sub-region SUB1 and the second sub-region SUB2 of the first memory MEM1 and the second memory MEM2, read a first boundary compensation value Edata1 from the first sub-region SUB1, and read a second boundary compensation value Edata2 from the second sub-region SUB2.

The first timing controller TCON1 can correct first video data DATA1 based on the first main compensation value Mdata1, the first boundary compensation value Edata1, and the second boundary compensation value Edata2. For example, the first timing controller TCON1 can apply the first main compensation value Mdata1, the first boundary compensation value Edata1, and the second boundary compensation value Edata2 to a predetermined compensation algorithm to calculate a first data correction offset and a first data correction gain and can correct the first video data DATA1 by adding the first data correction offset to the first video data DATA1 and multiplying the first video data DATA1 by the first data correction gain.

The second timing controller TCON2 can correct second video data DATA2 based on the second main compensation value Mdata2, the first boundary compensation value Edata1, and the second boundary compensation value Edata2. For example, the second timing controller TCON2 can apply the second main compensation value Mdata2, the first boundary compensation value Edata1, and the second boundary compensation value Edata2 to the predetermined compensation algorithm to calculate a second data correction offset and a second data correction gain and can correct the second video data DATA2 by adding the second data correction offset to the second video data DATA2 and multiplying the second video data DATA2 by the second data correction gain.

In a case where the first and second boundary compensation values Edata1 and Edata2 are applied to the compensation algorithm, the first and second timing controllers TCON1 and TCON2 can use an average value of the first and second boundary compensation values Edata1 and Edata2. But the present disclosure is not limited thereto. Other algorithm is possible, for example, the first and second timing controllers TCON1 and TCON2 can use a root mean square of the first and second boundary compensation values Edata1 and Edata2. The first and second timing controllers TCON1 and TCON2 can perform image data correction processing on pixels near a boundary line based on correlation between shared first and second boundary compensation values Edata1 and Edata2, and thus, a possibility that a visual step occurs near a boundary line can be considerably reduced.

As shown in FIG. 7, it can be seen that a visual step near the boundary line LRB is far more reduced in an image display state of a state, where boundary compensation values are shared, than an image display state of a state where the boundary compensation values are not shared. When the first and second boundary compensation values Edata1 and Edata2 are correlated in an image processing (i.e., compensation processing) operation, distortion of an input image near the boundary line LRB can be minimized.

Moreover, the first and second timing controllers TCON1 and TCON2 can correlate the shared first boundary compensation value Edata1 with the shared second boundary compensation value Edata2 and can perform image processing, and thus, the accuracy and reliability of compensation for a time change of a display panel can be enhanced.

Figure 8:
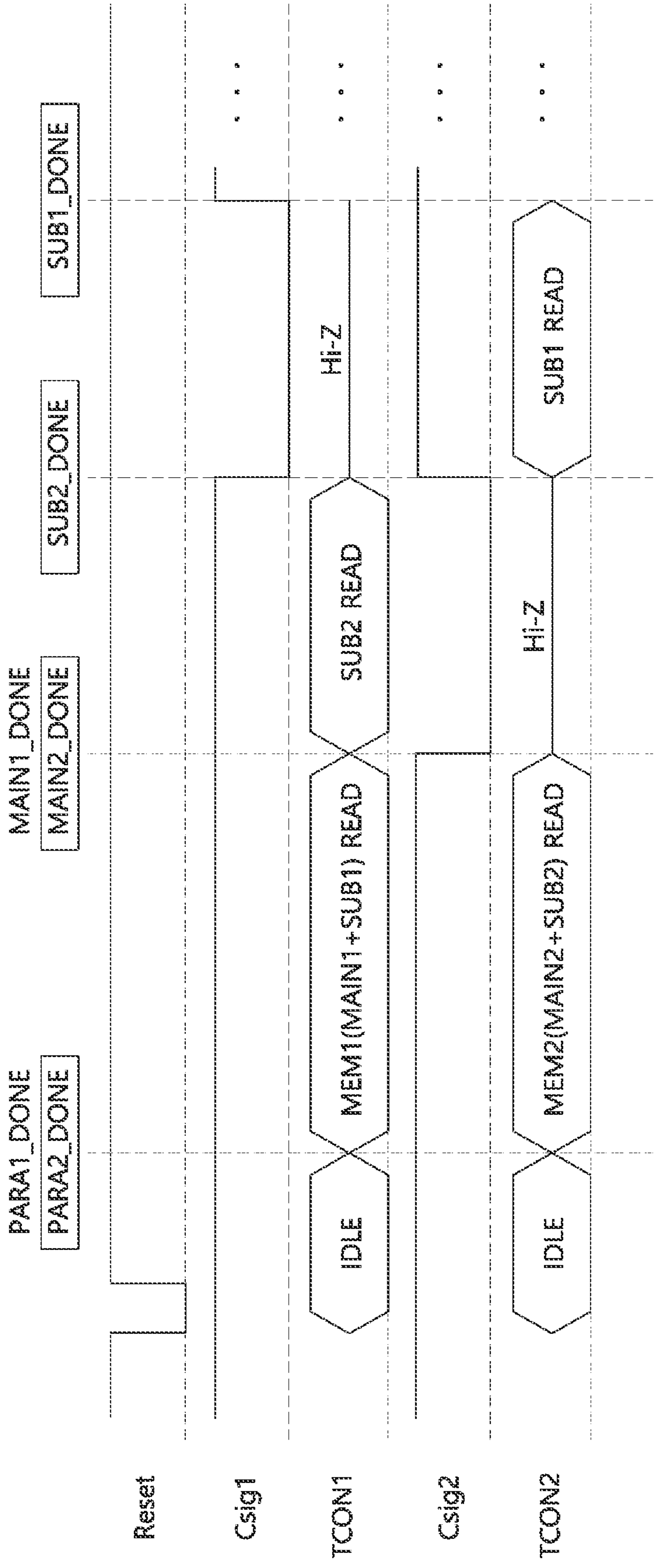
FIGS. 8 and 9 are diagrams showing a driving sequence between a memory and a timing controller for divisional driving.
Figure 9:
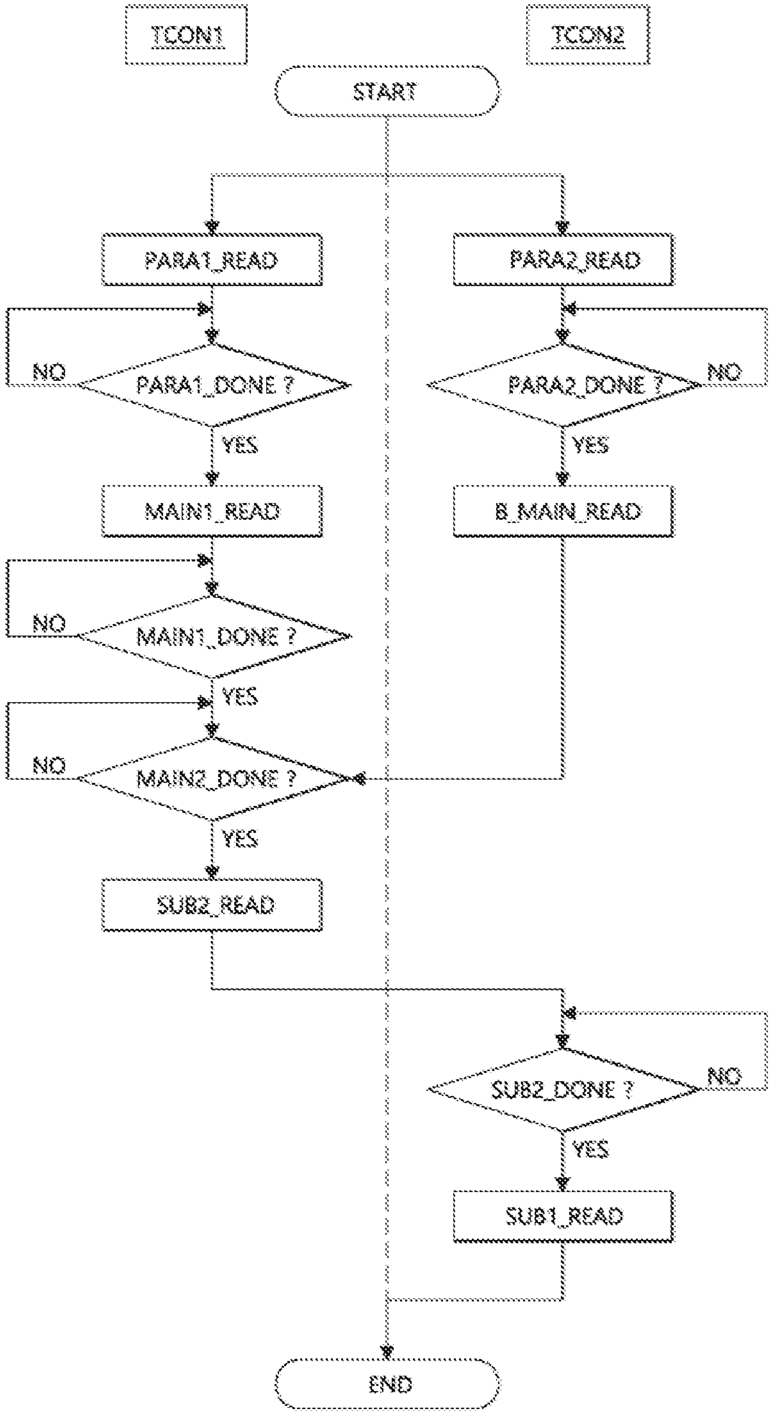

FIGS. 8 and 9 are diagrams showing a driving sequence between a memory and a timing controller for divisional driving.

Referring to FIGS. 8 and 9, when a system power source is turned on, a reset signal can be generated, and subsequently, timing controllers TCON1 and TCON2 can respectively read global compensation parameters (for example, first and second global compensation parameters) PARA1 and PARA2 from a separate register. The global compensation parameters PARA1 and PARA2 can be parameters applied to an image quality compensation algorithm. The first global compensation parameter PARA1 can be applied to first image data which is to be applied to pixels of a first active region, and the second global compensation parameter PARA2 can be applied to second image data which is to be applied to pixels of a second active region.

When a read operation on the global compensation parameters PARA1 and PARA2 is completed, the timing controllers TCON1 and TCON2 can simultaneously access memories (for example, first and second memories) MEM1 and MEM2 and can read compensation values therefrom. In other words, in response to a first control signal Csig1, the first timing controller TCON1 can access a first main region MAIN1 and a first sub-region SUB1 of the first memory MEM1 and can read a first main compensation value and a first boundary compensation value. At this time, in response to a second control signal Csig2, the second timing controller TCON2 can access a second main region MAIN2 and a second sub-region SUB2 of the second memory MEM2 and can read a second main compensation value and a second boundary compensation value. At a first timing, all of the first control signal Csig1 and the second control signal Csig2 can be activated.

Subsequently, at a second timing which differs from the first timing, in response to the first control signal Csig1, the first timing controller TCON1 can access the second sub-region SUB2 of the second memory MEM2 and can read the second boundary compensation value. At the second timing, in response to the second control signal Csig2, the second timing controller TCON2 can be in a Hi-Z state, and thus, an access collision between the timing controllers TCON1 and TCON2 can be prevented. At the second timing, the first control signal Csig1 can be activated, and the second control signal Csig2 can be deactivated.

Subsequently, at a third timing which differs from the first timing and the second timing, in response to the second control signal Csig2, the second timing controller TCON2 can access the first sub-region SUB1 of the first memory MEM1 and can read the first boundary compensation value. At the third timing, in response to the first control signal Csig1, the first timing controller TCON1 can be in a Hi-Z state, and thus, an access collision between the timing controllers TCON1 and TCON2 can be prevented. At the third timing, the second control signal Csig2 can be activated, and the first control signal Csig can be deactivated.

The present embodiments can realize the following effects.

In the present embodiments, a screen of a display panel can be divided into a plurality of active regions and driven. Because timing controllers for controlling divisional driving of the active regions perform image processing based on shared boundary compensation values, a possibility that a visual step occurs near a boundary line between the active regions can be considerably reduced.

Accordingly, the present embodiments can provide a display apparatus having a high resolution and a large screen for realizing uniform image quality in a whole screen.

The effects according to the present disclosure are not limited to the above examples, and other various effects can be included in the specification.

While the present disclosure has been particularly shown and described with reference to exemplary embodiments thereof, it will be understood by those of ordinary skill in the art that various changes in form and details can be made therein without departing from the spirit and scope of the present disclosure as defined by the following claims.

What is claimed is:

1. An electroluminescent display apparatus comprising:

a display panel including a first active region configured to display first image data and a second active region configured to display second image data;

a first memory configured to store a first main compensation value and a first boundary compensation value, corresponding to first pixels in the first active region;

a second memory configured to store a second main compensation value and a second boundary compensation value, corresponding to second pixels in the second active region;

a first timing controller configured to control the first image data based on the first main compensation value, the first boundary compensation value, and the second boundary compensation value; and a second timing controller configured to control the second image data based on the second main compensation value, the second boundary compensation value, and the first boundary compensation value.

2. The electroluminescent display apparatus of claim 1, further comprising:

a first driving circuit configured to apply corrected first image data to the first pixels based on control by the first timing controller; and a second driving circuit configured to apply corrected second image data to the second pixels based on control by the second timing controller.

3. The electroluminescent display apparatus of claim 1, wherein the first memory comprises a first main region configured to store the first main compensation value and a first sub-region configured to store the first boundary compensation value, and the second memory comprises a second main region configured to store the second main compensation value and a second sub-region configured to store the second boundary compensation value.

4. The electroluminescent display apparatus of claim 3, wherein the first timing controller monopolizes the first main region of the first memory, the second timing controller monopolizes the second main region of the second memory, and the first timing controller and the second timing controller share the first sub-region of the first memory and the second sub-region of the second memory.

5. The electroluminescent display apparatus of claim 4, wherein the first timing controller accesses the first main region and the first sub-region of the first memory at a first timing, and the second timing controller accesses the second main region and the second sub-region of the second memory at the first timing.

6. The electroluminescent display apparatus of claim 5, wherein the first timing controller accesses the second sub-region of the second memory at a second timing which differs from the first timing, and the second timing controller accesses the first sub-region of the first memory at a third timing which differs from the first timing and the second timing.

7. The electroluminescent display apparatus of claim 1, wherein the first active region and the second active region are divided along a direction of gate lines of the display panel.

8. The electroluminescent display apparatus of claim 7, wherein the gate lines are disposed across a boundary line between the first active region and the second active region without disconnection.

9. The electroluminescent display apparatus of claim 7, wherein the first boundary compensation value is a common compensation value for compensating for a driving characteristic deviation of pixels disposed near the boundary line in both of the first active region and the second active region, and wherein the second boundary compensation value is a common compensation value for compensating for a driving characteristic deviation of pixels disposed near the boundary line in both of the first active region and the second active region.

10. The electroluminescent display apparatus of claim 9, wherein the first main compensation value includes compensation values for compensating for a driving characteristic deviation of pixels other than the pixels disposed near the boundary line in the first active region, and the second main compensation value includes compensation values for compensating for a driving characteristic deviation of pixels other than the pixels disposed near the boundary line in the second active region.

11. The electroluminescent display apparatus of claim 9, wherein the driving characteristic deviation includes one or more among:

a threshold voltage deviation of a driving thin film transistor (TFT) included in a pixel, an electron mobility deviation of the driving TFT, and a threshold voltage deviation of a light emitting device.

12. The electroluminescent display apparatus of claim 1, wherein the first timing controller controls the first image data based on the first main compensation value and an average value of the first boundary compensation value and the second boundary compensation value, and the second timing controller controls the second image data based on the second main compensation value and an average value of the first boundary compensation value and the second boundary compensation value.

13. A driving device for an electroluminescent display apparatus including a first active region of a display panel including first pixels and a second active region of the display panel including second pixels, the first active region configured to display first image data and the second active region configured to display second image data, the driving device comprising:

a first memory configured to store a first main compensation value and a first boundary compensation value, corresponding to the first pixels;

a second memory configured to store a second main compensation value and a second boundary compensation value, corresponding to the second pixels;

a first timing controller configured to correct the first image data based on the first main compensation value, the first boundary compensation value, and the second boundary compensation value; and a second timing controller correcting the second image data based on the second main compensation value, the second boundary compensation value, and the first boundary compensation value.

14. The driving device of claim 13, further comprising:

a first driving circuit configured to apply corrected first image data to the first pixels based on control by the first timing controller; and a second driving circuit configured to apply corrected second image data to the second pixels based on control by the second timing controller.

15. The driving device of claim 13, wherein the first memory comprises a first main region configured to store the first main compensation value and a first sub-region configured to store the first boundary compensation value, and the second memory comprises a second main region configured to store the second main compensation value and a second sub-region configured to store the second boundary compensation value.

16. The driving device of claim 15, wherein the first timing controller monopolizes the first main region of the first memory, the second timing controller monopolizes the second main region of the second memory, and the first timing controller and the second timing controller share the first sub-region of the first memory and the second sub-region of the second memory.

17. The driving device of claim 16, wherein the first timing controller accesses the first main region and the first sub-region of the first memory at a first timing, and the second timing controller accesses the second main region and the second sub-region of the second memory at the first timing.

18. The driving device of claim 17, wherein the first timing controller accesses the second sub-region of the second memory at a second timing which differs from the first timing, and the second timing controller accesses the first sub-region of the first memory at a third timing which differs from the first timing and the second timing.

* * * * *